United States Patent
Hansen et al.

(10) Patent No.: US 8,191,410 B2
(45) Date of Patent: Jun. 5, 2012

(54) MECHANICAL DRIVE TRAIN FOR TESTING FULL SCALE COMPRESSOR RIGS AND GAS TURBINES

(75) Inventors: Christian Michael Hansen, Simpsonville, SC (US); Douglas Giles Moody, Piedmont, SC (US); Karl Dean Minto, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 466 days.

(21) Appl. No.: 12/549,670

(22) Filed: Aug. 28, 2009

(65) Prior Publication Data

US 2011/0048119 A1 Mar. 3, 2011

(51) Int. Cl.
*G01M 15/14* (2006.01)
(52) U.S. Cl. .................................... 73/112.05
(58) Field of Classification Search .............. 73/112.01, 73/112.03, 112.05, 112.06
See application file for complete search history.

(56) References Cited

U.S. PATENT DOCUMENTS

| | | | |
|---|---|---|---|
| 6,364,602 B1 | 4/2002 | Andrew et al. | |
| 7,174,797 B2 * | 2/2007 | Brostmeyer et al. | 73/865.6 |
| 7,574,904 B1 * | 8/2009 | Davies et al. | 73/112.01 |
| 8,079,257 B2 * | 12/2011 | Shimizu et al. | 73/455 |
| 2004/0216535 A1 * | 11/2004 | Brostmeyer et al. | 73/865.6 |
| 2005/0086939 A1 * | 4/2005 | Schmid | 60/726 |
| 2007/0089548 A1 * | 4/2007 | Brostmeyer et al. | 73/866 |

* cited by examiner

*Primary Examiner* — Eric S McCall
(74) *Attorney, Agent, or Firm* — Dority & Manning, P.A.

(57) ABSTRACT

A mechanical drive train for testing a full scale compressor rig is disclosed. The drive train can include an electric motor, a gear box, and a gas turbine. The compressor rig is coupled to the drive train between the gear box and gas turbine. The drive train can further include a torque converter for transferring torque from the electric motor to the compressor rig. The drive train is configured to test a full scale compressor rig over the entire speed and load operating range, allowing for full compressor mapping from choke to stall at full load, part load (power turn down) and partial speed conditions. The drive train can also be used to test a compressor rig or gas turbine over the full range of operability for the compressor rig or gas turbine without having to connect the gas turbine to the power grid at the power generation site.

17 Claims, 4 Drawing Sheets

MECHANICAL DRIVE TRAIN FOR TESTING FULL SCALE COMPRESSOR RIGS AND GAS TURBINES

FIELD OF THE INVENTION

The present disclosure relates generally to gas turbines, and more particularly to a mechanical drive train assembly for testing full scale compressor rigs and gas turbines.

BACKGROUND OF THE INVENTION

Gas turbines are widely used in commercial operations for power generation. A gas turbine typically includes a compressor located at the front, one or more combustors around the middle, and a turbine at the rear. The compressor can include multiple stages of compressor blades attached to a rotor. Ambient air, as a working fluid, enters an inlet of the compressor, and rotation of the compressor blades progressively compresses the working fluid. The compressor can include inlet guide vanes (IGVs) and variable stator vanes (VSVs) which can be used to control the flow of ambient air into the compressor.

Some of the compressed working fluid is extracted from the compressor through extraction ports for other use, and the remainder of the working fluid exits the compressor and flows to the combustors. The working fluid mixes with fuel in the combustors, and the mixture ignites to generate combustion gases having a high temperature, pressure, and velocity. The combustion gases exit the combustors and flow to the turbine where they expand to produce work.

During the design cycle, a new compressor rig design typically must be validation tested and mapped to determine whether the compressor rig design will achieve critical to quality standards. For example, various tests can be performed to determine compressor airfoil steady state and transient aeromechanics. As another example, compressor maps can be generated for the compressor at various different shaft speed and load conditions. The compressor maps can be used to determine surge margins for the compressor rig as well as the aerodynamic design point for the compressor.

Due to the high shaft power demand, it is often difficult to perform validation testing and mapping over the full operating range of a full scale compressor rig. For instance, a gas turbine does not become self-sustaining until it achieves a relatively high percentage of full shaft speed. Thus, it can be difficult to obtain partial speed mapping of a compressor rig or gas turbine because the gas turbine would either operate outside of its operability range or below the self-sustaining speed. In addition, a gas turbine often cannot contribute enough starting power to start a compressor rig.

Validation testing and mapping of a compressor rig are often performed using sub-scale compressor rigs. Such sub-scale compressor rigs may range from ⅓ to ⅕ the scale of a full scale compressor rig. The design of a sub-scale compressor rig usually has to be carefully managed so that airfoil attachment and associated damping effects are not compromised. The testing of sub-scale compressor rigs can also create a need to correct performance measurements to address, for instance, Reynold's number effects, blade tip clearance, and thermal growth differences. Furthermore, the design of a sub-scale rig usually precedes the design of the full scale counterpart, requiring dedicated resources for design, product definition and procurement. Indeed, the need to design a sub-scale rig can add about two years to the overall design cycle of a new product.

Various techniques are also known for testing a gas turbine. For instance, it is known to use a water brake or other load device to simulate various load conditions for a gas turbine during gas turbine testing. However, such testing is limited for high power mapping because of the increased fuel flow requirements and because the turbine temperatures can exceed the limits of the turbine hardware. Partial speed mapping using this technique also may not be achievable because the gas turbine would either operate outside its operability range or below the self-sustaining speed.

Gas turbines and compressor rigs can be validation tested and mapped at a power generation site while connected to the power grid. However, off frequency (partial speed) testing of a gas turbine or compressor rig cannot be performed while connected to the power grid. Moreover, testing of a gas turbine or compressor rig at the power generation site often results in inconvenience to the power generation provider and imposes limits on the ability to redesign should the validation testing or compressor mapping reveal a potential problem with the gas turbine or compressor rig.

Thus, there is a need for an apparatus and method that can be used to test a full scale compressor rig over the entire speed and load operating range, allowing for full compressor mapping from choke to stall at full load, part load (power turn down) and partial speed conditions. There is also a need for an apparatus and method that can be used to test a compressor rig or gas turbine over the full range of operability for the compressor rig or gas turbine without having to connect the gas turbine and compressor rig to the power grid at the power generation site.

BRIEF DESCRIPTION OF THE INVENTION

Aspects and advantages of the invention will be set forth in part in the following description, or can be obvious from the description, or can be learned through practice of the invention.

One exemplary embodiment of the present invention is directed to a drive train for testing a full scale compressor rig. The drive train includes an electric motor and a gas turbine. The compressor rig is connected between the electric motor and the gas turbine. The chive train is configured to drive the compressor rig over a complete range of operability for the compressor rig.

Various additions or modifications can be made to this exemplary embodiment of the invention.

For instance, another exemplary embodiment of the present invention is directed to a method for testing a full scale compressor rig. The method includes providing a drive train comprising an electric motor, a torque converter, a gear box, and a gas turbine. The method further includes operably connecting the compressor rig to the drive train between the gear box and the gas turbine. The method further includes simulating an operating condition for the compressor rig using the drive train and generating test data based on the simulation of the operating condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, directed to one of ordinary skill in the art, is set forth in the specification, which makes reference to the appended figures, in which.

DETAILED DESCRIPTION

Figure 1:
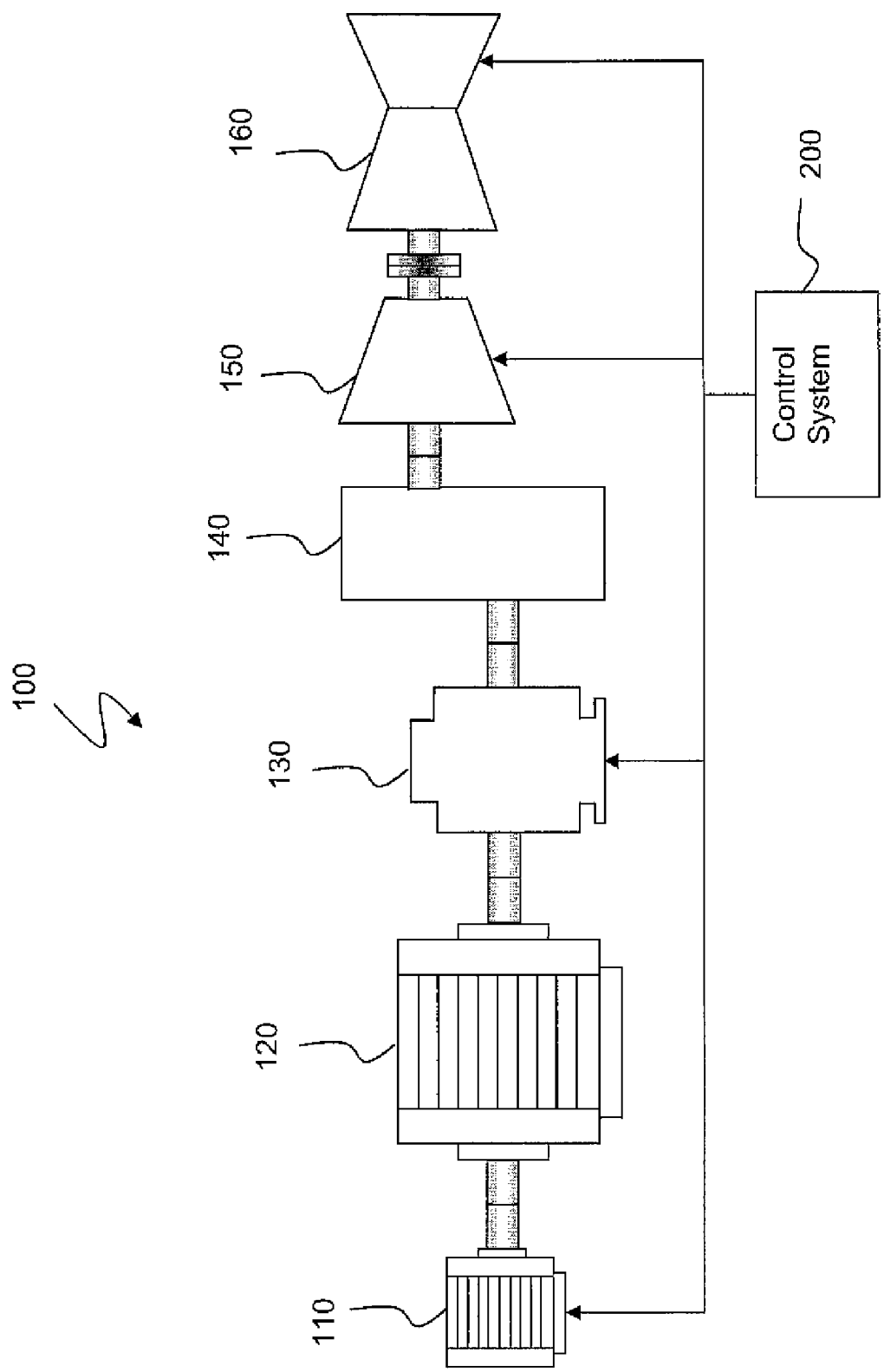
FIG. 1 provides a conceptual block diagram of a drive train according to one exemplary embodiment of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

In general, the present disclosure is directed to a system and method for testing a full scale compressor rig over a complete range of shaft speed and load conditions.

FIG. 1 provides a conceptual block diagram of a drive train 100 according to one exemplary embodiment of the present disclosure. As shown, drive train 100 can include motor starter 110, electric motor 120, torque converter 130, gear box 140, compressor rig 150, and gas turbine 160 all connected in a single line train. The components of drive train 100 can be coupled together using any known shaft coupling device or technique. Drive train 100 can include control system 200 to control various aspects and parameters of the components of drive train 100.

As illustrated, compressor rig 150 is connected to drive train 100 between gear box 140 and gas turbine 160. A 60 Hz (3600 rpm nominal full shaft speed) gas turbine can be used for testing a 60 Hz compressor. A 50 Hz (3000 rpm nominal full shaft speed) gas turbine can be used for testing a 50 Hz compressor. Gas turbine 160 does not become self-sustaining until it achieves a relatively high percentage of its full shaft speed and is not able to contribute start power to start drive train 100.

As such, electric motor 120 is used to provide starting torque to drive train 100. Electric motor 120 can be controlled by motor starter 110 or can be controlled by control system 200. Electric motor 120 can either be a synchronous electric motor or a variable speed induction motor. If electric motor 120 is a variable speed induction motor, a power electronics system can be used to control the torque and speed output of the variable speed induction motor. Such power electronics system can be included as part of motor starter 110 or can be separate from motor starter 110. In other embodiments, the power electronics system can be a part of control system 200.

Electric motor 120 can also be a synchronous motor, such as a large 4-pole synchronous motor sized with a very high output power. For example, electric motor 120 can be a 4-pole, 58 MW, 1800 rpm synchronous motor. A synchronous electric motor can operate continuously at maximum rated speed for the motor. In one embodiment, a synchronous motor can be provided with a variable frequency drive to provide desired shaft speed and torque to compressor rig 150. In other embodiments, torque converter 130 and gear box 140 can be used to provide desired shaft speed and torque to compressor rig 150.

Torque converter 130 is used to transfer torque and shaft speed from electric motor 120 to compressor rig 150. Torque converter 130 can be any device for transferring torque and speed from electric motor 120 to compressor rig 150, such as a viscous coupling torque converter. For instance, torque converter 130 can be a viscous coupling torque converter having a variable speed transmission.

Generally, the lower the output shaft speed of torque converter 130, the greater the output torque of torque converter 130. The output of torque converter 130 can depend on various operating parameters of torque converter 130. For instance, in one embodiment, the torque converter 130 can be a viscous coupling torque converter whose output shaft speed and torque is dependent on the amount of operating fluid used in the torque converter. In this manner, the shaft speed and torque applied to compressor rig 150 can be controlled by varying the operating parameters of torque converter 130. For example, in one embodiment, gas turbine 160 and compressor rig 150 can be decoupled from drive train 100 by draining operating fluid from torque converter 130.

Gear box 140 is used to provide the maximum torque and efficiency from torque converter 130 to compressor rig 150. Gear box 140 can be, for example, an industrial gear box having a gear ratio sufficient to convert the output speed of torque converter 130 to the speed of the compressor rig 150 and gas turbine 160. Those of ordinary skill in the art, using the disclosures provided herein, should recognize that any suitable gear ratio for converting the output speed of the torque converter 130 to the speed of the compressor rig 150 can be used without deviating from the scope of the present disclosure.

Compressor rig 150 is operably connected to drive train 100 between gear box 140 and gas turbine 160. Drive train 100 is configured to drive compressor rig 150 through a complete range of operability of both speed and load conditions for compressor rig 150. For instance, drive train 100 is configured to drive compressor rig 150 over the entire operational speed and load range, allowing for full compressor performance mapping from choke to stall at full load, part load (power turn down) and partial speed conditions.

Control system 200 (illustrated in FIG. 1) is used to control shaft speed and to control load conditions. For instance, control system 200 can control shaft speed by varying parameters of torque converter 130. As another example, control system 200 can control load conditions by adjusting inlet guide vanes (IGVs) and variable stator vanes (VSVs) to control the flow of ambient air into the compressor rig. Control system 200 can also control the rate at which fuel is supplied to gas turbine 160. Those of ordinary skill in the art, using the teachings provided herein, should recognize that various other operating parameters can be adjusted by control system 200 to control load and shaft speed conditions without deviating from the scope of the present disclosure.

Figure 2:
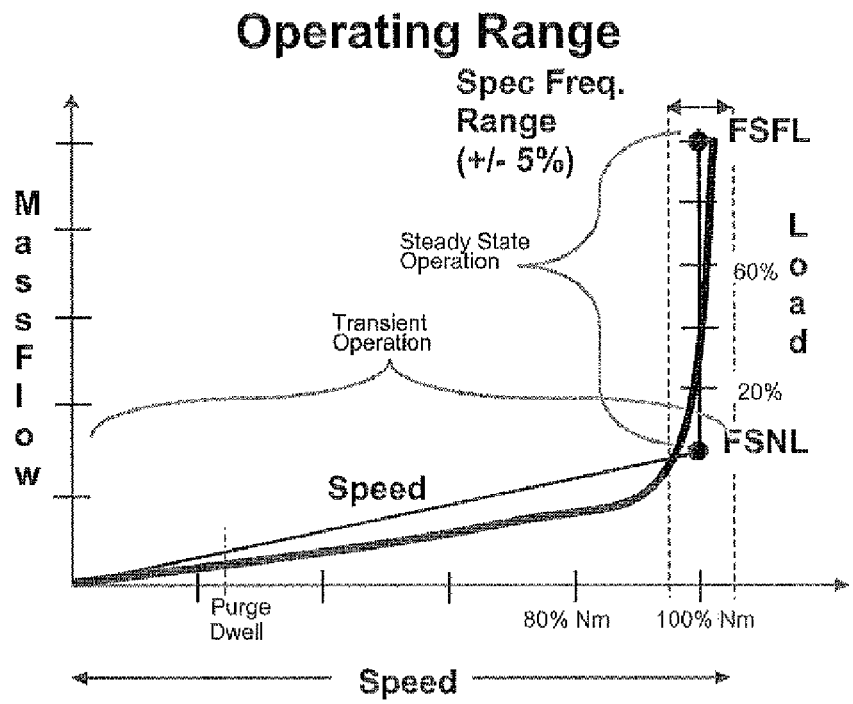
FIG. 2 provides a chart illustrating the complete operating range for an exemplary gas turbine and compressor rig.

With reference to FIG. 2, the complete operating range of an exemplary compressor rig and gas turbine will now be described in detail. FIG. 2 generally plots shaft speed of a compressor rig and gas turbine versus mass flow through the compressor rig and gas turbine. As illustrated, the plot includes two different typical gas turbine operational regions: (1) the fill speed steady state operation region; and (2) the partial speed transient operation region.

The full speed operation region occurs when the compressor rig and gas turbine are operating at about 100% of nominal full shaft speed for the compressor rig and gas turbine, such as within ±5% of the nominal full shaft speed for the compressor and gas turbine. The nominal full shaft speed for a 60 Hz gas turbine is about 3600 rpm shaft mechanical speed. The nominal full shaft speed for a 50 Hz gas turbine is about 3000 rpm shaft mechanical speed.

As used herein, the term mechanical speed ($N_m$) is intended to refer to the actual speed of rotation of the shaft of the compressor rig and gas turbine. The term corrected speed ($N_c$) is intended to refer to the corrected speed of rotation of the shaft of the compressor rig or gas turbine adjusted for temperature. In addition, any time a percentage of speed is provided in the present disclosure, such percentage of speed is intended to refer to a percentage of nominal fill speed. For instance, 50% mechanical speed is intended to indicate that the actual speed of rotation of the shaft is about 50% of the nominal full speed for the gas turbine or compressor rig.

As shown, the full speed operation region includes two boundary operation points: (1) Full Speed Full Load (FSFL); and (2) Full Speed No Load (FSNL). A drive train according to exemplary embodiments of the present disclosure can vary the load applied to the gas turbine and the compressor rig between FSFL and FSNL by adjusting various operating parameters of the compressor rig and the gas turbine. For instance, control system 200 of drive train 100 (shown in FIG. 1) can adjust inlet guide vanes (IGVs) and variable stator vanes (VSVs) to control the flow of ambient air into compressor rig 150. Control system 200 can also control the rate at which fuel is supplied to gas turbine 160. Those of ordinary skill in the art, using the teachings provided herein, should recognize that various other operating parameters can be adjusted by control system 200 without deviating from the scope of the present disclosure. By adjusting various operating parameters, drive train 100 can simulate operating conditions across the full range of load conditions, from FSNL to FSFL, for a compressor rig. Testing at power less than FSFL is known as power turn down testing.

Referring still to FIG. 2, partial speed operation of the gas turbine and compressor rig is illustrated in the transient operation portion. A drive train according to exemplary embodiments of the present disclosure can simulate operating conditions in the partial speed portion of FIG. 2 by adjusting the speed applied from the drive train to the compressor rig. Importantly, a drive train according to embodiments of the present disclosure can hold the compressor rig and gas turbine at a partial speed for an extended period of time so that "steady state" validation tests and compressor maps can be generating using partial speed operating conditions.

Figure 3:
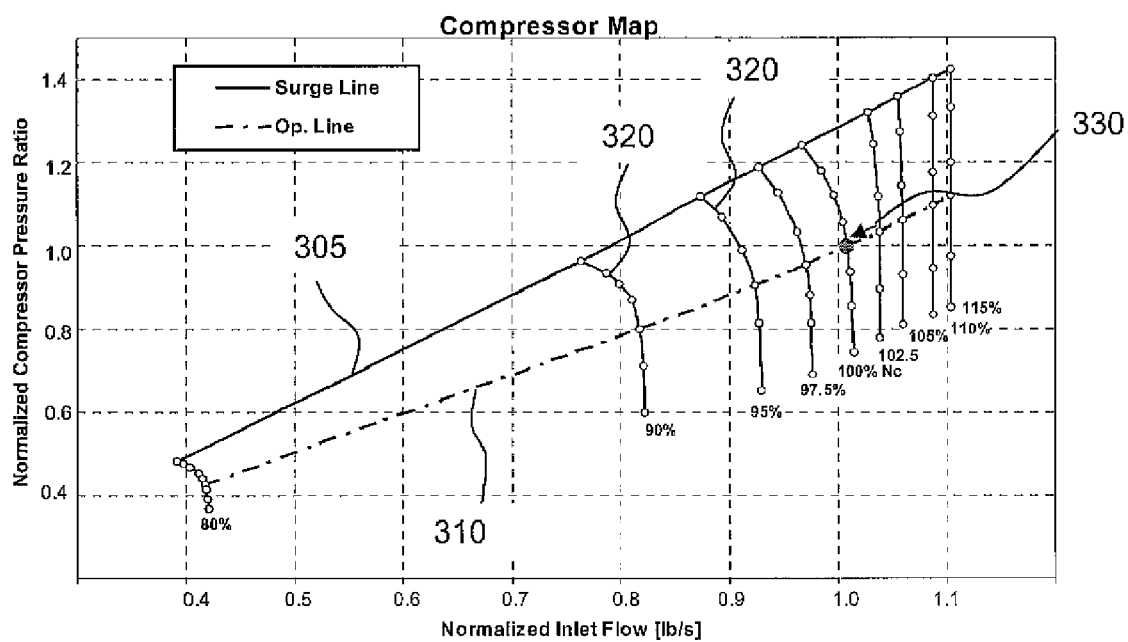
FIG. 3 provides an exemplary compressor map for an exemplary compressor rig.

The drive train according to embodiments of the present disclosure can be used to generate compressor maps for different operating conditions for a full scale compressor. FIG. 3 illustrates a typical compressor map which is a plot of pressure ratio versus flow. As illustrated, compressor map includes surge line 305 and operating line 310. Surge line 305 indicates the pressure ratios at which the flow separates from the blades and reverses direction and represents the absolute limit of the compressor rig at a given speed. Operating line 310 illustrates allowable combinations of pressure ratio and flow and is selected to provide a desired surge margin. The surge margin is the relative range of allowable compressor ratios for the compressor rig under given operating conditions.

The exemplary compressor map illustrated in FIG. 3 further includes a plurality of speed-lines 320. Speed-lines 320 illustrate various operating points, from choke to stall, of the compressor at different corrected shaft speeds. At the intersection of the 100% corrected speed-line and the operating line 310 is the aerodynamic design point 330. During the design cycle, compressor maps are useful in determining compressor operating performance, efficiency, a desired surge margin and aerodynamic design point 330 for a compressor rig.

A drive train according to embodiments of the present disclosure can be used to generate compressor map data for a variety of different speed and load conditions. For instance, the drive train can be used to generate full load speed-lines, from choke to stall, at about 85% to about 115% corrected speed for the compressor rig, such as at about 100% corrected speed, at about 105% corrected speed, at about 110% corrected speed, at about 97.5% corrected speed, at about 95% corrected speed, at about 90% corrected speed, or at about 85% corrected speed, or any other corrected speed or range of corrected speeds therebetween. The drive train can also be used to generate partial speed speed-lines, from choke to stall, at about 20% to about 85% corrected speed for the compressor rig, such as at about 80% corrected speed, at about 70% corrected speed, at about 60% corrected speed, at about 50% corrected speed, at about 40% corrected speed, at about 30% corrected speed, or at any other corrected speed or range of corrected speeds there between.

The drive train can also be used to generate various power turndown speed-lines from full load to no load conditions, such as at about 80% load, 60% load, 40% load or any other load, from choke to stall, at about 85% to about 115% corrected speed for the compressor rig, such as at about 100% corrected speed, at about 105% corrected speed, at about 110% corrected speed, at about 97.5% corrected speed, at about 95% corrected speed, at about 90% corrected speed, or at about 85% corrected speed, or at any other corrected speed or range of corrected speeds therebetween.

Other test data can be generated from the operating conditions simulated using drive train 100. A non-exclusive list of general critical to quality standards include: airfoil steady state aeromechanics; airfoil transient aeromechanics; IGV and VSV design point performance and optimization; IGV and VSV turndown performance and optimization; stage characteristics definition over a range of ambient temperature and VSV settings; IGV/VSV and start bleeding stall mitigation; airfoil aeromechanics sensitivity to bleed valve positions; airfoil clearance measurements; performance based start IGV/VSV optimization; and shaft torque measurements. Any of the above validation testing and mapping can be performed while the drive train is simulating various operating conditions for the compressor rig.

With reference now to FIGS. 4-7, various operating modes for drive train 100 for simulating different operating conditions over the entire speed and load operating range for compressor rig 150 will now be set forth. Using the disclosures provided herein, those of ordinary skill in the art will appreciate that the modes of operation discussed below can be operated in any sequence or not operated all without deviating from scope of the present disclosure.

Figure 4:
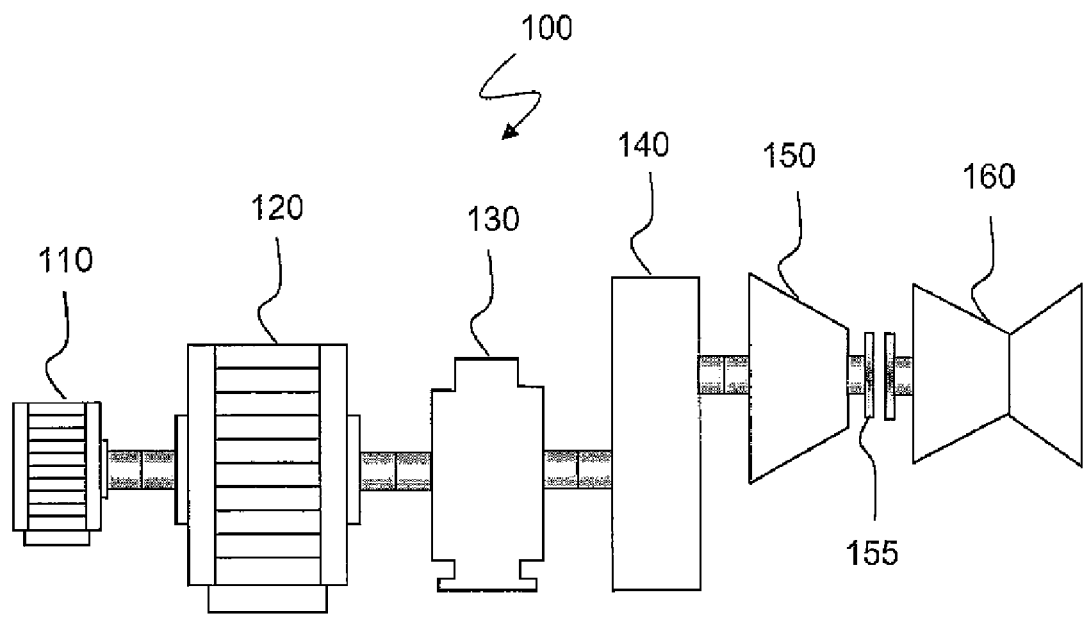
FIGS. 4-7 provide conceptual block diagrams illustrating different modes of operation for the exemplary drive train assembly according to exemplary embodiments of the present invention.

A first mode of operation that can be used for simulating operating conditions for compressor rig 150 is illustrated in FIG. 4. As illustrated, drive train 100 includes electric motor 120, torque converter 130, gear box 140, compressor rig 150, and gas turbine 160. In this mode, gas turbine 160 is uncoupled from the drive train 100. The gas turbine 160 can be uncoupled from drive train 100 by disengaging exemplary shaft coupling 155. In this operating mode, electric motor 120 is used to drive compressor rig 150 to partial speed steady state conditions for compressor mapping and testing. For instance, electric motor 120 can drive compressor rig 150 to a corrected speed in the range of about 30% to about 85% corrected speed, such as about 50% corrected speed, about 60% corrected speed, about 70% corrected speed, or about 80% corrected speed, or any other corrected speed or range of corrected speeds therebetween. Test data generated at such operating conditions for drive train 100 can include partial speed speed-line mapping, from choke to stall, at corrected speeds in the range of about 30% to about 85% corrected speed, such as about 50% corrected speed, about 60% corrected speed, about 70% corrected speed, or about 80% corrected speed, or any other corrected speed or range of corrected speeds therebetween.

Figure 5:
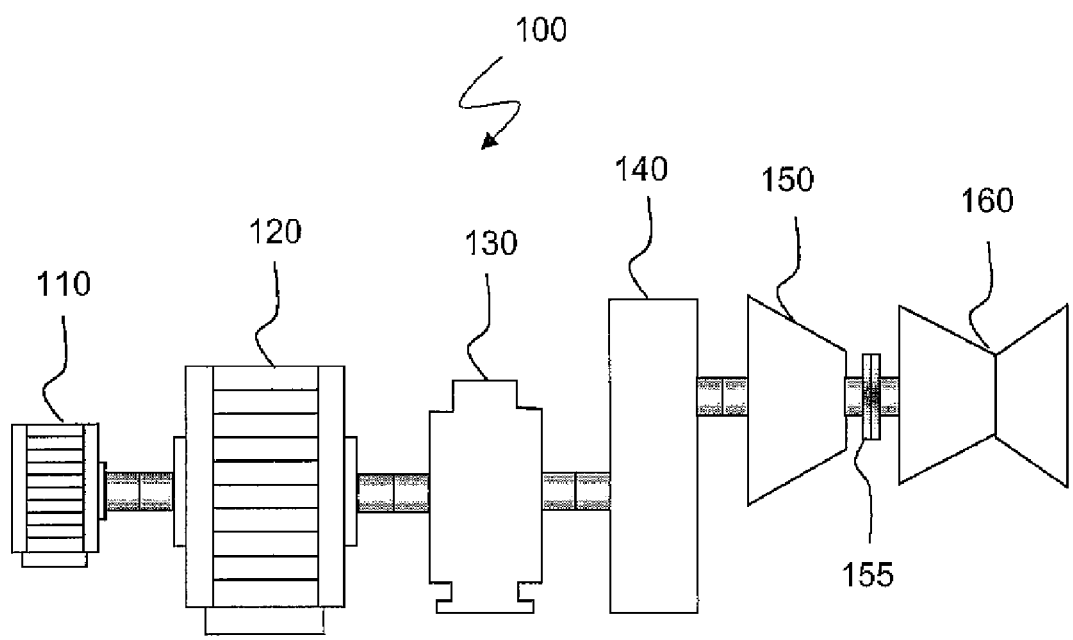

A second mode of operation that can used for simulating operating conditions for compressor rig 150 is illustrated in FIG. 5. In this mode, gas turbine 160 is coupled to drive train 100. As illustrated, shaft coupling 155 engages the respective shafts for compressor rig 150 and gas turbine 160. In this operating mode, electric motor 120 is used to drive compressor rig 150 to partial speed steady state conditions for compressor mapping and testing. The gas turbine is operated unfired so as to act as a load for compressor rig 150. In this manner, compressor rig 150 can be driven to low speed conditions, such as corrected speeds in the range of about 20% to about 50% corrected speed. The unfired gas turbine 160 provides load to prevent excess acceleration of compressor rig 150 due to the large motor power of electric motor 120 and the high torque applied from torque converter 130 at low shaft speed conditions. Test data generated during the second mode of operation for drive train 100 can include partial speed speed-line mapping, from choke to stall, at corrected speeds in the range of about 20% to about 50% corrected speed, such as at about 30% corrected speed or about 40% corrected speed, or any other corrected speed or range of corrected speeds therebetween.

Figure 6:
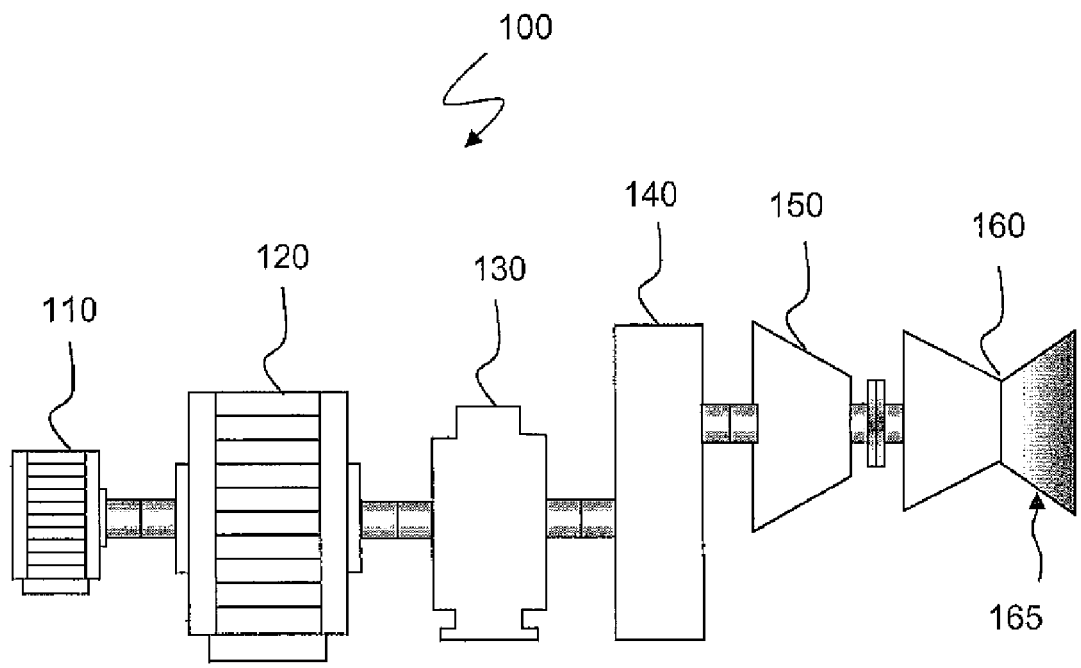

A third mode of operation that can be used for simulating operating conditions for compressor rig 150 is illustrated in FIG. 6. In this mode, gas turbine 160 is coupled to compressor rig 150 so that all components in drive train 100 are coupled together. Electric motor 120 is operated at full speed and gas turbine 160 is fired (as indicated at arrow 165) in normal fashion. This mode of operation allows for transient speed testing of the compressor rig, over and under speed testing at FSNL conditions, and at all other loaded conditions. Both gas turbine 160 and electric motor 120 contribute torque to drive compressor rig 150.

During the third mode of operation, electric motor 120 and gas turbine 160 can apply torque to the compressor rig 150 to drive the compressor to about 85% to about 115% corrected speed. Test data generated during the third mode of operation for drive train 100 can include full load speed-line mapping, from choke to stall, at corrected speeds in the range of about 85% to about 115% corrected speed, such as at about 100% corrected speed, at about 105% corrected speed, at about 110% corrected speed, at about 97.5% corrected speed, at about 95% corrected speed, at about 90% corrected speed, or at about 85% corrected speed, or any other corrected speed or range of corrected speeds therebetween. Test data generated during the third mode of operation can also include power turndown speed-lines from full load to no load conditions, such as at about 80% load, 60% load, 40% load or any other load, from choke to stall, at about 85% to about 115% corrected speed for the compressor rig, such as at about 100% corrected speed, at about 105% corrected speed, at about 110% corrected speed, at about 97.5% corrected speed, at about 95% corrected speed, at about 90% corrected speed, or at about 85% corrected speed, or at any other corrected speed or range of corrected speeds therebetween.

Figure 7:
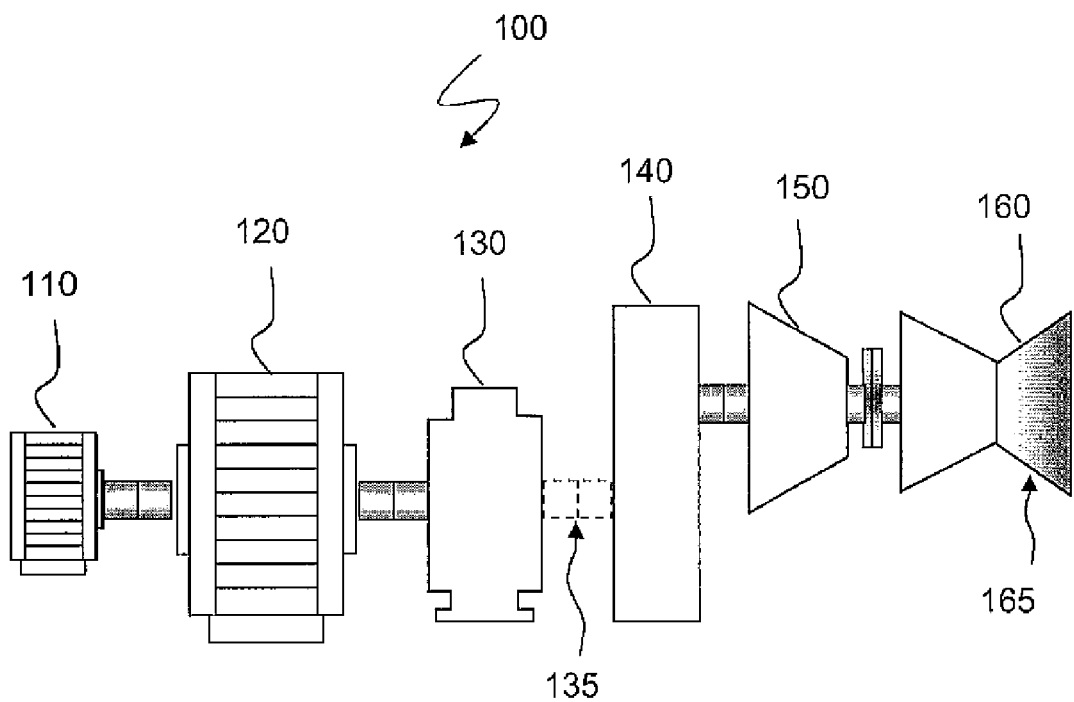

A fourth mode of operation that can be used for simulating operating conditions for compressor rig 150 and gas turbine 160 is illustrated in FIG. 7. In this mode, the drive train 100 is used to apply torque to compressor rig 150 and gas turbine 160 so that the compressor rig and gas turbine are operating at about 85% to about 110% corrected speed. Compressor rig 150 and gas turbine 160 are then decoupled from drive train 100 such that compressor rig 150 is used as a load device and gas turbine 160 is the test article. Compressor rig 150 and gas turbine 160 can be decoupled from drive train 100, for example, by draining operating fluid from torque converter 130. Arrow 135 of FIG. 7 indicates the decoupling of gas turbine 160 and compressor rig 150 from electric motor 120.

The fourth mode of operation for drive train 100 can be used to test a new or existing gas turbine. The compressor rig 150 acts as the load device for the gas turbine, allowing for testing of gas turbine 160, including the compressor, combustion system, and hot gas path hardware at all load conditions, including off-frequency (under speed and over speed) while loaded. For instance, the following exemplary test data related to the gas turbine can be generated during the fourth mode of operation: turbine airfoil aeromechanics; turbine airfoil thermal profiles; clearances; combustor validation; validate compressor airfoils; compressor performance verification; and shaft torque measurements.

The fourth mode of operation provides many advantages for testing a new or existing gas turbine design. For example, off-frequency testing while loaded is not possible at a power generation site because the gas turbine and generator are synchronized to the electric grid. Moreover, testing a gas turbine at a power generation site may place severe operational burdens or constraints on the power generation provider. In addition, testing of the gas turbine can occur earlier in the gas turbine development cycle than it would at a power generation site and can identify potential problems sooner that can require redesign or manufacturing cycles to resolve.

Other validation test data that can be generated during the each mode of operation can relate to any of the following: airfoil steady state aeromechanics, airfoil transient aeromechanics; IGV and VSV design point performance and optimization; IGV and VSV turndown performance and optimization; stage characteristics definition of a range of ambient temperature and VSV settings; IGV/VSV and start bleed rotating stall mitigation; airfoil aeromechanics sensitivity to bleed valve position, airfoil clearance measurements, rotor/casing thermal behavior measurements, performance based start IGV/VSV optimization; and/or shaft start torque measurement.

The subject matter of the present disclosure provides the ability to test a full scale compressor rig over the entire speed and load operating range, allowing for full compressor mapping from choke to stall at full load, part load (power turn down) and partial speed conditions. Airfoil aeromechanics can be ascertained for all operating conditions, including the off-frequency (partial speed) operating conditions typically not achievable as part of a gas turbine test. The present subject matter simplifies the design by eliminating the step of designing a subscale compressor for validation testing and mapping. The design and procurement team can thus dedicate resources to one compressor airfoil design that will be used as the final product, saving time and resources.

While the present subject matter has been described in detail with respect to specific exemplary embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A drive train for testing a compressor rig, comprising:
an electric motor;
a gas turbine;
a torque converter; and
a gear box operatively connected to said torque converter;
wherein said compressor rig is operably connected to said drive train between said electric motor and said gas turbine, said torque converter and said gear box being operatively connected to said drive train between said electric motor and said compressor rig, said drive train configured to drive said compressor rig over a complete range of operability for said compressor rig.

2. The drive train of claim 1, wherein said torque converter is a viscous coupling torque converter.

3. The drive train of claim 2, wherein said torque converter can be drained to disconnect said electric motor from said drive train.

4. The drive train of claim 1, wherein said electric motor is a variable speed induction motor.

5. The drive train of claim 1, wherein said drive train further comprises a control system for controlling parameters of said electric motor, said compressor rig, and said gas turbine.

6. The drive train of claim 1, wherein said drive train further comprises a motor starter operably connected to said electric motor.

7. A method for testing a full scale compressor rig, the method comprising:
operably connecting a compressor rig to a drive train, the drive train comprising an electric motor, a torque converter, a gear box, and a gas turbine, the compressor rig being operably connected to the drive train between said gear box and said gas turbine;
simulating an operating condition for said compressor rig using said drive train; and
generating test data based on said simulation of said operating condition.

8. The method of claim 7, wherein said step of simulating an operating condition comprises:
uncoupling said gas turbine from said drive train; and
applying torque to said compressor rig to operate said compressor rig at partial speed.

9. The method of claim 8, wherein said test data comprises partial speed speed-line mapping at corrected speeds in the range of about 50% to about 85% corrected speed for said compressor rig.

10. The method of claim 7, wherein said step of simulating an operating condition comprises:
coupling said gas turbine to said compressor rig;
applying torque to said compressor rig to operate said compressor rig at partial speed; and
operating said gas turbine unfired so that said gas turbine operates as a load on said compressor rig.

11. The method of claim 10, wherein said test data comprises partial speed speed-line mapping at corrected speeds in the range of about 20% to about 50% corrected speed for said compressor rig.

12. The method of claim 7, wherein said step of simulating an operating condition comprises:
coupling said gas turbine to said compressor rig;
firing said gas turbine;
applying torque to said compressor rig so that said compressor rig operates from about 85% to about 115% corrected speed;
varying the load applied to said compressor rig using a control system adapted to vary parameters of said compressor rig and said gas turbine.

13. The method of claim 12, wherein said test data comprises full load speed-lines at corrected speeds in the range of about 85% to about 115% corrected speed for said compressor rig.

14. The method of claim 12, wherein said test data comprises power turndown speed-lines at corrected speeds in the range of about 85% to about 115% corrected speed for said compressor rig.

15. The method of claim 7, wherein said step of simulating an operating condition comprises:
coupling said gas turbine to said compressor rig;
applying torque to said compressor rig to operate said compressor rig from about 85% to about 115% corrected speed;
decoupling said compressor rig and said gas turbine from said drive train.

16. The method of claim 15, wherein said step of decoupling said compressor rig and said gas turbine comprises draining fluid from said viscous coupling torque converter.

17. The method of claim 15, wherein said test data comprises data related to said gas turbine.

* * * * *